Aug. 30, 1927.
F. L. BARBER
SHIM FOR CAR TRUCKS
Filed April 24, 1926
1,640,391
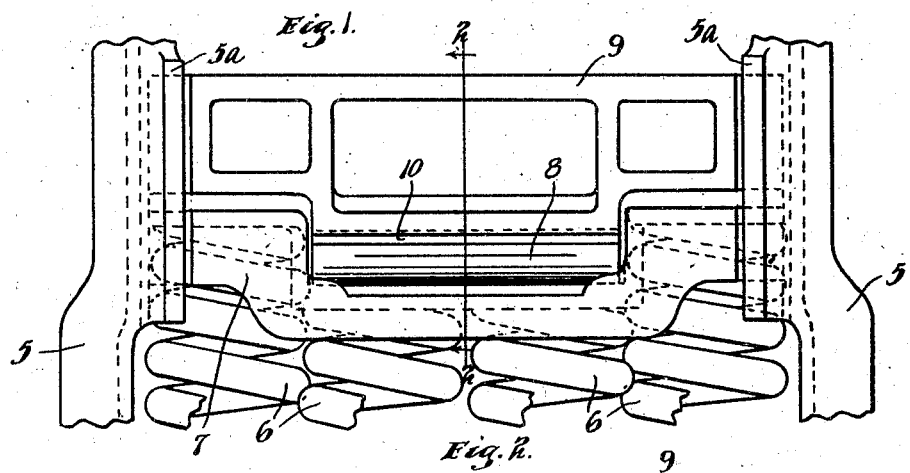
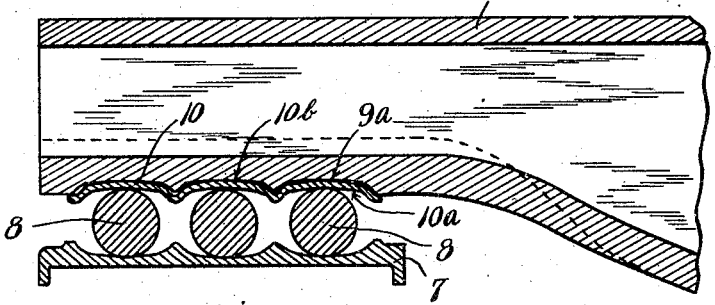
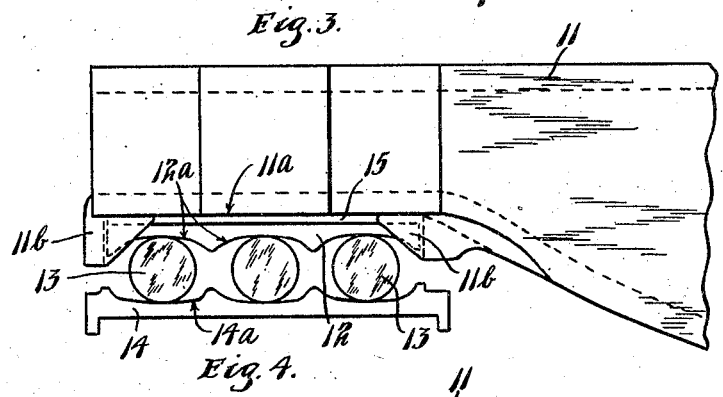
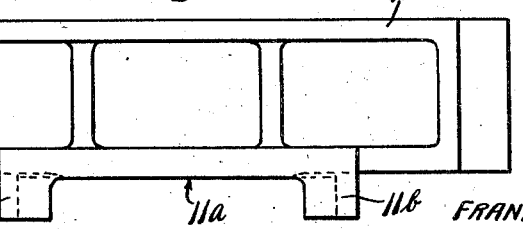
INVENTOR.
FRANKLIN L. BARBER.
BY HIS ATTORNEYS.

Patented Aug. 30, 1927.

1,640,391

UNITED STATES PATENT OFFICE.

FRANKLIN L. BARBER, OF CHICAGO, ILLINOIS, ASSIGNOR TO STANDARD CAR TRUCK COMPANY, OF CHICAGO, ILLINOIS, A CORPORATION OF NEW JERSEY.

SHIM FOR CAR TRUCKS.

Application filed April 24, 1926. Serial No. 104,376.

This invention relates to a car truck, and particularly to a novel construction for bringing certain parts to the proper height after the steel wheels on the car truck have been turned down for renewal. As is well known to those skilled in the art, the bolster of a car truck is supported at the ends on springs carried in the side frames. In the prior art, when the wheels had been turned down, it was the custom to place a shim under the bottom of the springs which supported the bolster. This construction served fairly well where all of the springs were supported on the same level and one shim plate could be placed under the bottoms of all of the springs. In some modern trucks, however, the springs are disposed at different heights, usually with a center group at one level and side groups at a higher level. In shimming up such a truck it would be necessary to use separate shims under the side springs and another separate shim under the center group of springs. Such a construction is objectionable and difficulty would be encountered in keeping all of the shims properly positioned and at the proper height.

It is an object of the present invention, therefore, to provide a structure of a car truck, using a shim between the bolster and the support for the same at the top of the springs.

It is a further object of the invention to provide such a shim in a truck structure in which the bolster is arranged for endwise movement, the shim being disposed immediately under the bolster and above the supporting means therefor, which supporting means permit the endwise movement.

It is still another object of the invention to provide a shim for a car truck having a bolster supported on rollers for endwise movement, which shim is formed as the top bearing plate for the rollers and fits into the roller bearing seat on the under side of the bolster.

It is more specifically an object of the invention to provide a shim for a bolster arranged for endwise movement, which shim is formed of a comparatively thin one piece metal plate having a plurality of roller bearing surfaces on its under side and having its upper side formed substantially to fit the center of the roller bearing surfaces on the under side of the bolster, the side portions of the shim being eased away to insure proper contact directly over the normal centers of the rollers.

These and other objects and advantages of the invention will be fully set forth in the following description made in connection with the accompanying drawings, in which like reference characters refer to similar parts throughout the several views and in which:—

Fig. 1 is a partial view in end elevation of a truck bolster, showing the invention applied thereto;

Fig. 2 is a central vertical section substantially on line 2—2 of Fig. 1, as indicated by the arrows;

Fig. 3 is a partial view in side elevation of a modified form of a bolster and supporting parts; and Fig. 4 is a view in end elevation of the parts shown in Fig. 3.

Referring to the drawings, a part of the side frame of a railway truck is shown comprising bolster columns 5 having the bearing bolster surfaces 5ª thereon which are spaced to suit the width of the bolster and face each other. The bolster columns 5 are joined at the bottom of the side frame and support the springs 6. It will be seen that the springs 6 have their upper ends disposed at different heights and in the top of the truck illustrated, the side springs are also supported at different heights at their lower ends. The center groups of springs 6 of which there are usually four are supported at one height and the end springs 6 of which there are usually two at each end, are supported at a higher elevation which is the same distance above the bottom of center springs 6 as the top of the end springs is above the top of the center springs. The springs 6 have seated thereon and support the spring cap or roller bearing plate 7 which has flanges extending down at each side of the springs and is usually provided with spring centering means (not shown). The plate 7 has a plurality of roller bearing surfaces formed as concave grooves therein, in which are disposed the rollers 8 forming the supporting bearing rollers for the bolster 9. As the truck is ordinarily made, the bolster 9 also has a plurality of roller bearing surfaces formed as concave grooves 9ª in its under surface which respectively engage the rollers 8. In accordance with the present invention, instead of placing shims under the springs when the wheels have been turned down, a shim plate 10 is provided, shaped at its top surface to fit in and between the grooves 9ᵃ. This bearing plate is constructed to have on its under surface a plurality of surfaces formed as concave grooves 10ᵃ therein. The top of the plate 10 is formed so as not to contact over the entire surface of grooves 9ᵃ. The top surface of each of the curved portions 10ᵇ of plate 10 at the center of said portion is formed on substantially the same radius as the radius of the roller 8. The top surface of each of the portions 10ᵇ is sloped downwardly from the central portion on a line substantially tangent to the central portion, so that the top surface of the plate 10 is spaced from the under surface of the bolster except along the central portions of the grooves 9ᵃ. In practice, one size of roller which is commonly used is two inches in diameter, and with such rollers the central portion of the top surface of each of the curved portions 10ᵇ of the plate 10 will be formed on a 1½ inch radius and the top surface of each of said portions at the sides of said central portion will be formed on a larger radius. The top surface of the shim plate 10 between the grooves 9ᵃ in the bottom of the bolster is disposed below the ribs formed between the grooves 9ᵃ. With this construction the shim plate bears in the center of each of the grooves 9ᵃ and a 3-point bearing is secured, insuring that the shim will properly engage the under surface of the bolster. The under surfaces of the curved portions 10ᵇ of the plate 10, or the surfaces 10ᵃ at their central portions are also formed on substantially the same radius as the radius of the bearing rollers 8 and at the sides of this central portion are formed on a longer radius extending tangent to the central portion. In practice, where a two inch roller is used, the radius at the central portion of the surface 10ᵃ is substantially 1½ inches and at the side portions the radius is substantially 5 inches. This gives a proper bearing surface for the rollers 8 to accommodate all of the lateral movement which is permitted the bolster between the bolster columns 5ᵃ.

In operation the bolster is supported on the rollers 8 as usual, except that the shim 10 now contacts directly with the rollers and the bolster contacts with the upper side of the shim 10. As above stated, a 3-point line bearing is secured and the shim plate is at the same time properly held in place in the grooves 9ᵃ. The plate is also kept from lateral movement by the sides of the spring cap plate 7 extending at each side thereof, as shown in Fig. 1. The shim 10 is thus properly kept in position. By the use of the shim 10, therefore, one shim takes the place of the three shims which would be necessary if the shim plates were placed under the springs 6 as in the former constructions. The plate 10 can be easily and quickly formed and easily and quickly placed in position and functions to raise the truck bolster to the proper height.

In Figs. 3 and 4 a slightly different form of a truck bolster 11 is shown, which has a flat under surface 11ᵃ. Said bolster also has downwardly extending lugs 11ᵇ arranged at the corners of a rectangle and of angular shape in horizontal cross section which form retaining means for the roller cap plate 12. The cap plate 12 as usual has the grooves 12ᵃ formed in its under surface, the surfaces of which form the bearing surfaces for the rollers 13 which rollers bear in the grooves 14ᵃ formed in the top surface of the spring cap plate 14. With such a bolster as shown in Figs. 3 and 4 a shim plate 15 comprising merely a flat thin plate is placed between the bolster 11 and the roller bearing plate 12. The shim plate 15 will be held in place by the lugs 11ᵇ and the bolster will rest directly on said shim plate, the shim plate in turn resting on the top of roller bearing plate 12.

In operation of the structure shown in Figs. 3 and 4, the bolster will move as usual on the rollers 13 and is merely elevated the thickness of the shim plate 15.

From the above description it is seen that applicant has provided a very simple and efficient structure for bringing the bolster to the proper height after the wheels have been turned down. The invention results in a fewer number of parts and quite a simplification of the structure. As stated, the structure is easily made and assembled and constitutes quite an advance in the art. The device has been amply demonstrated in actual practice and found to be very successful and efficient.

It will be understood, of course, that various changes may be made in the form, details, arrangement and proportions of the parts without departing from the scope of applicant's invention, which, generally stated, consists in a device capable of carrying out the objects above set forth, in the novel parts and combinations of parts disclosed and defined in the appended claims.

What is claimed is:—

1. A shim adapted to be used for the bolster of a car truck having a roller side bearing therein, said shim comprising a plate having a top surface adapted to bear directly against the bottom roller bearing surface of the bolster and having a bottom surface formed to bear directly against the top surface of the roller bearing.

2. A car truck structure having in combination, a side frame having spaced bolster columns, a bolster having its end disposed between said columns and having a plurality of concave grooves formed on its under surface forming bearing surfaces for said bolster, a plurality of rollers for supporting said bolster and respectively contacting said surfaces and a shim plate disposed beneath said bolster and formed to extend into said grooves and the bottom thereof and having roller bearing grooves formed in its bottom surface having bearing surfaces engaging said roller.

3. The structure set forth in claim 2, said shim plate having the top surface of each of its portions which extends into a groove in the bottom surface of said bolster engaging the bottom surfaces of said grooves along the central line thereof and sloping away from the bottom surface of said grooves at each side of said central line, whereby said bearing plate engages said bolster along three spaced lines.

4. A shim for a bolster of a car truck which is constructed and arranged for motion laterally of the car and supported on rollers, said shim having a top surface with portions extending into the roller bearing grooves in the bottom of said bolster and being formed on its under surface with roller bearing grooves adapted to engage the supporting rollers for said bolster.

5. The structure set forth in claim 4, the portions of said shim plate extending into the roller bearing grooves on said bolster engaging the surface of said grooves substantially at the center line thereof and sloping away from said surface at each side of said center line.

6. A car truck structure having in combination, a side frame having bolster columns, a bolster having its end disposed between said columns, center and side springs carried by said side frame, at different heights, rollers supported by said springs for carrying the weight of the bolster and a shim plate disposed between the bottom of the bolster and said rollers.

In testimony whereof I affix my signature.

FRANKLIN L. BARBER.